Dec. 23, 1958
E. E. HOOD
2,865,477
AUTOMATIC TWO-SPEED GEARING AND HUB BRAKE
FOR VELOCIPEDES AND THE LIKE
Filed March 14, 1955
2 Sheets—Sheet 1
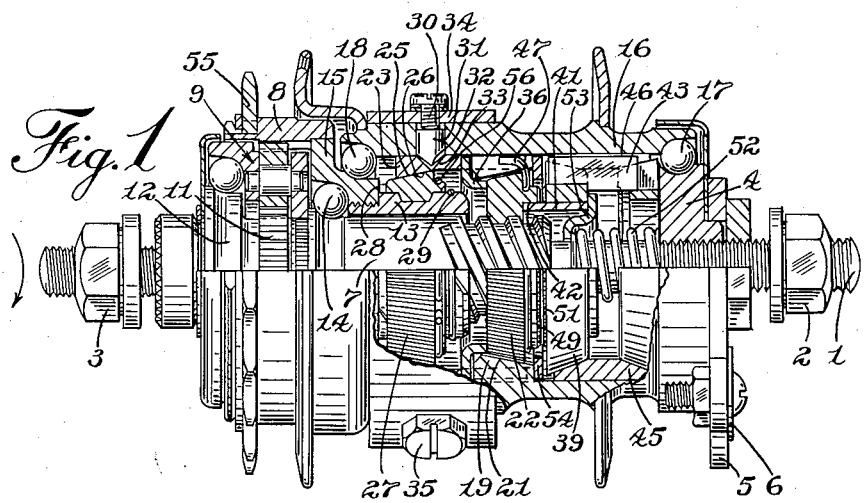
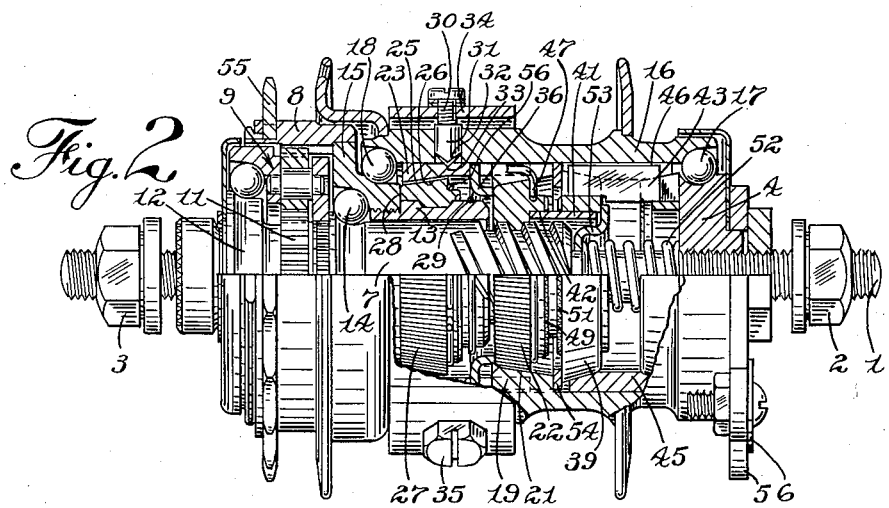
INVENTOR.
Edwin Elliott Hood
WITNESS:
Esther M. Stockton
BY
Clinton S. Janes
ATTORNEY Dec. 23, 1958　　　　　　　　E. E. HOOD　　　　　　　　2,865,477
AUTOMATIC TWO-SPEED GEARING AND HUB BRAKE
FOR VELOCIPEDES AND THE LIKE
Filed March 14, 1955　　　　　　　　　　　　　　　　2 Sheets-Sheet 2
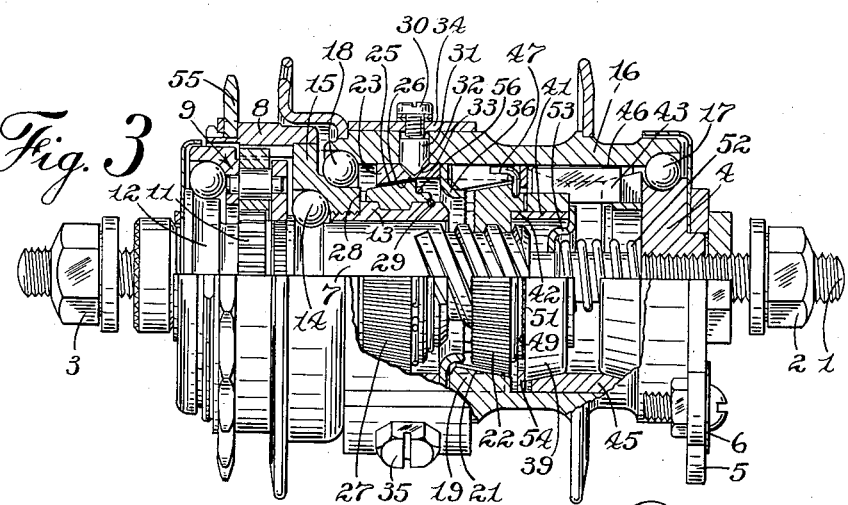
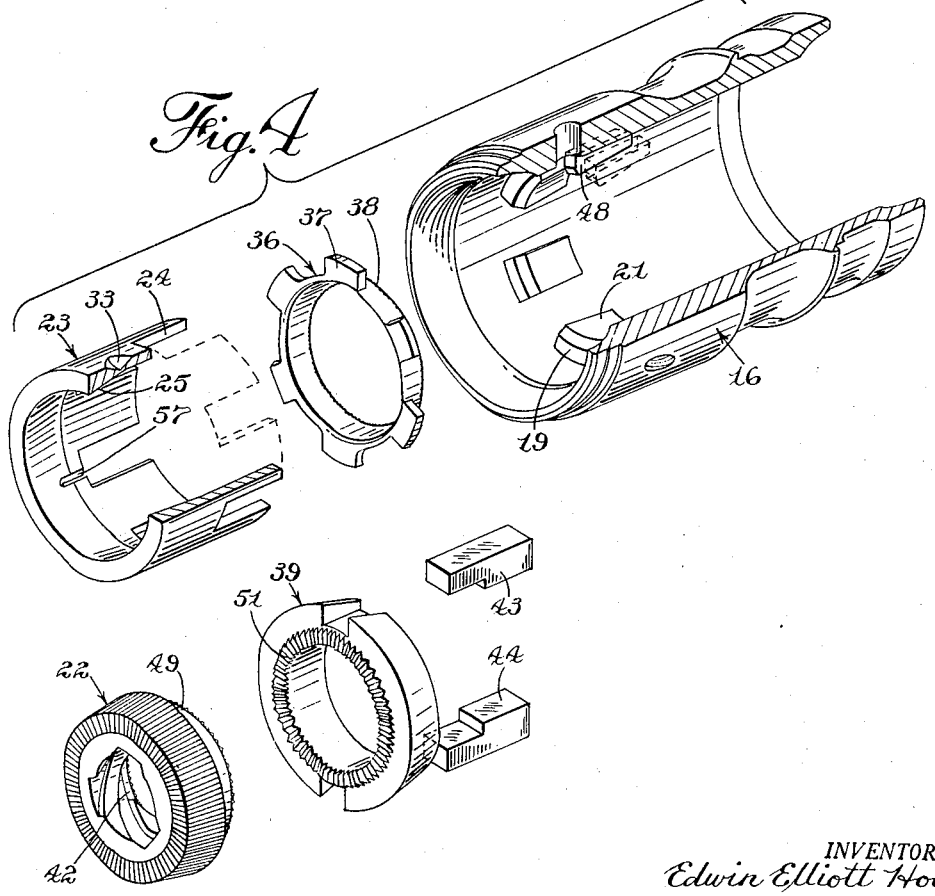
INVENTOR.
Edwin Elliott Hood
BY
Clinton S. Janes
ATTORNEY
WITNESS:
Esther M. Stockton United States Patent Office 2,865,477
Patented Dec. 23, 1958

2,865,477

AUTOMATIC TWO-SPEED GEARING AND HUB BRAKE FOR VELOCIPEDES AND THE LIKE

Edwin Elliott Hood, Elmira, N. Y., assignor to Bendix Aviation Corporation, a corporation of Delaware Application March 14, 1955, Serial No. 494,123

7 Claims. (Cl. 192—6)

The present invention relates to an automatic two-speed gearing and hub brake for velocipedes and the like, and more particularly to such gearing in which the shift from high to low gear is made responsive to the transmission of a predetermined maximum torque.

The present invention is in the nature of an improvement of the structure disclosed in applicant's prior application Ser. No. 453,519, filed September 1, 1954, now Patent No. 2,742,124.

It is an object of the present invention to provide a novel device of the above character which is simple in construction, economical to manufacture, positive in action and well adapted to transmit heavy loads without distortion or damage to the parts.

It is another object to provide such a device incorporating means for readily adjusting the critical torque effective to cause the device to shift down to low gear.

It is another object to provide such a device which, having shifted down, remains in low gear until the load is substantially relieved, or if desired, until the driving pedals are arrested or moved backward by the operator.

It is another object to provide such a device incorporating provisions to prevent the brake from jamming or locking up when the vehicle is rolled backward.

Further objects and advantages will be apparent from the following description taken in connection with the accompanying drawing in which:

Fig. 1 is a side elevation, partly broken away and in section of a preferred embodiment of the invention showing the parts in the positions assumed in high speed driving relation;

Fig. 2 is a similar view showing the parts in the positions assumed during operation in low gear;

Fig. 3 is a similar view showing the method of application of the brake; and

Fig. 4 is an exploded view in perspective of certain of the operating parts partly broken away and in section to show the internal construction.

In Fig. 1 of the drawing there is illustrated an axle 1 adapted to be clamped in the frame of the vehicle, not illustrated, by means of clamp nuts 2 and 3. An anchor and brake expander member 4 is adjustably mounted on the axle 1 and prevented from rotation by means of an anchor arm 5 non-rotatably mounted thereon and attached to the frame of the vehicle by means of a clip 6.

A low speed screw shaft 7 is journalled on the axle 1 and is rotated from a driving member 8 by means of planetary reduction gearing indicated generally by numeral 9 and comprising a stationary sun gear 11 forming a part of a bearing member 12 which is immobilized by being clamped to the vehicle frame. A high speed screw shaft 13 is rotatably mounted on the low speed shaft 7 by means of bearings 14, and is rigidly connected to the driving member 8 by means of an intermediate bearing member 15. The wheel hub 16 is rotatably mounted at its ends by means of bearings 17 and 18 on the anchor member 4 and bearing member 15 respectively. An annular series of clutch projections 19 (Fig. 4) are formed on the interior of the hub and are provided with tapered surfaces 21 adapted to cooperate with a similarly tapered surface of a low speed driving clutch member 22 threaded on the low speed screw shaft 7 in such manner that forward rotation of the screw shaft in the direction of the arrow in Fig. 1 causes the clutch member 22 to engage the driven clutch elements 19 and thereby transmit rotation to the hub 16.

A high speed driven clutch sleeve 23 is slidably mounted in the interior of the hub 16 and non-rotatably connected therewith by means of axial slots 24 (Fig. 4) which slidably embrace the low speed driven clutch elements 19 to form a splined connection with the hub. Clutch sleeve 23 has an interior tapered clutch surface 25 adapted to cooperate with a similarly tapered surface 26 on a high speed driving clutch member 27 threaded on the high speed screw shaft 13 in such manner that rotation of said high speed screw shaft in a forward direction causes the clutch member 27 to engage and drive the driven clutch sleeve 23 and thereby rotate the hub at the same speed as the driving member 8. Travel of the high speed driving clutch member 27 on the screw shaft 13 in the direction to engage the clutch is limited by a stop shoulder 28 on the bearing member 15, and travel in the opposite direction is limited by a stop ring 29.

Longitudinal movement of the driven clutch sleeve 23 responsive to the axial pressure of the driving clutch member 27 is yieldingly resisted by a plurality of plungers 31 slidably mounted for radial movement in the hub 16 and having tapered points 32 adapted to enter correspondingly tapered recesses 33 in the driven clutch sleeve 23. The plungers 31 are yieldably pressed into the recesses 33 by means of spring members 34 anchored on the exterior of the hub 16 by suitable means such as studs 35, and having at their free ends studs 30 adjustably threaded in the springs and bearing on said plungers.

Means are provided for moving the high speed driven clutch sleeve 23 out of engagement with the driving clutch member 27 when the low speed clutch is engaged, comprising a ring member 36 (Fig. 4) having radial lugs 37 seated in the slots 24 of said sleeve, and having a shoulder 38 adapted to be engaged by the low speed driving clutch member 22 as it moves toward engagement with the driven clutch projections 19 in the hub. Preferably the engaging surfaces of the ring 36 and driving clutch member 22 are knurled as indicated in order to assist in insuring the traversal of the parts to disengage the high speed clutch.

A movable brake expanding member 39 is slidably mounted on a sleeve 41 which is pressed into a counterbore 42 in the low speed driving clutch member 22, and is non-rotatably connected to the fixed anchor member 4 by means of keys 43, 44. Arcuate brake shoes 45, 46 rest on tapered surfaces of the expander members 4, 39 and abut against the keys 43, 44 whereby they are prevented from rotation while being pressed into frictional engagement with the interior of the hub during the braking operation.

Backward rotation of the low speed screw shaft 7 causes the clutch member 22 threaded thereon to be traversed toward the expander member 39; such traversal being insured by a drag ring 47 frictionally mounted on said clutch member and having an outturned end engaging in a slot 48 in one of the clutch projections 19. The adjacent surfaces of clutch member 22 and expander 39 are provided with dentals 49, 51 respectively to prevent rotation of said clutch member during the application of the brake. Means normally maintaining said members out of engagement is provided comprising a spring 52 seated on the axle 1, bearing at one end against the anchor member 4 and at its other end on a dished thrust annulus 53 which engages the sleeve 41 mounted in the clutch member 22. A spacer ring 54 is loosely mounted in the hub 16 against the ends of the clutch projections 19 to limit the travel of the expander member 39 toward clutch member 22, and to maintain the keys 43, 44 in position.

In the operation of the device, starting with the parts in the positions shown in Fig. 1, rotation of the driving member 8 by means of sprocket 55 in a forward direction causes traversal of the high speed driving clutch member 27 to the left to engage and transmit rotation to the driven clutch sleeve 23. The initiation of such traversal is preferably insured by means of a drag ring 56 frictionally mounted on the clutch member 27 and having an outturned end engaging in a notch 57 (Fig. 4) in the driven clutch sleeve. The axial pressure of clutch member 27 on the clutch sleeve 23 is yieldingly resisted by plungers 31 and springs 34, and during normal operation under moderate loads, the driving member 8 is connected through the high speed clutch members to rotate the sleeve 16 directly. When a predetermined maximum load is exceeded however, the axial movement of the driving clutch member to the left is positively arrested by the shoulder 28, and slippage of the high speed clutch then takes place. When this occurs, the rotation of the low speed screw shaft 7 through the reduction gear 9 exceeds the speed of rotation of the hub, and consequently becomes effective to traverse the low speed driving clutch member 22, which is frictionally connected to the hub by the drag ring 47, to the left into engagement with the low speed driven clutch projections 19. During this movement the low speed driving clutch member 22 engages the thrust ring 36 and causes it to force the driven high speed clutch sleeve 23 further to the left until it is disengaged from the high speed driving clutch member 27 as shown in Fig. 2. Operation of the device in low gear then proceeds.

When the operator desires to shift back into high gear it is merely necessary for him to stop the rotation of the pedals driving the sprocket 55, or possibly to rotate them backward slightly, depending upon the pitch of the threads on the screw shafts and the inclination of the engaging surfaces of the plungers 31 and sleeve 23, which are so designed as to provide the desired form of operation. This permits the plungers 31 to move the driven high speed clutch sleeve 23 back into engagement with the high speed driving clutch member 27, at the same time disengaging the low speed clutch elements, whereupon operation in high gear may be resumed.

When it is desired to operate the brake, backward rotation of the driving member 8 is transmitted to the low speed screw shaft 7 to traverse the low speed driving clutch member 22 to the right, such traversal being assisted both by the drag ring 47 and by the frictional drag of the thrust annulus 53 against the sleeve 41. The dentals 49, 51 are thus caused to engage and the brake elements 45, 46 are expanded by the screw-jack action of the screw shaft 7 and clutch member 22.

It will be understood that the driving load at which the shift from high gear to low gear takes place may be predetermined by selection of the proper calibrated springs 34, and by varying the pressure of the springs on the plungers 31 by adjusting the studs 30.

In the operation of the device, the drag ring 47 has another important function in helping to solve a problem frequently encountered in devices of this character, namely the liability of the brake becoming jammed or locked as a result of the operator rolling the bicycle backward. If this is done forcibly, the parts may be so tightly forced together that the device may have to be dismantled to effect their release.

This action may be understood by referring to Fig. 3 of the drawing, and disregarding for the moment the effect of the drag ring 47. As there shown, the low speed driving clutch member 22 has been moved to the right by backward rotation of screw shaft 7 into engagement with the non-rotatable brake expanding member 39. If now the wheel hub 16 is turned backward by rolling the wheel on the ground, the drag ring 56, which is anchored in the hub, rotates the high speed driving clutch member 27 with it, and thereby traverses it to the left on its screw shaft 13 till it engages the driven clutch member 23. Closure of the high-speed clutch thus accomplished compels the high-speed screw shaft 13 and driving member 8 to rotate backward with the hub 16. The low-speed screw shaft 7, being connected to the driving member 8 by the reduction gearing 9, is forced to rotate backward with very high torque due to the leverage of the wheel radius as compared to the radius of the shaft, compounded by the ratio of the reduction gearing. This obviously may easily cause the brake to be actuated with forces beyond its designed scope of operation, with the disadvantages above pointed out.

It is true that this torque is limited by the calibration of the high-speed clutch above described, but such undesired application of the brake is a disadvantage even though the forces involved are kept within limits.

The drag ring 47 operates to prevent this condition in the following manner: When the hub 16 is rotated backward, its speed of rotation is faster than that of screw shaft 7 since the latter is being rotated from the hub through the reduction gearing. This drag ring thus applies torque to the low speed driving clutch member 22 to rotate it backward faster than said screw shaft, thereby moving the member 22 to the left and holding it out of contact with the brake expander member 39. If deemed desirable, the dentals 49, 51 on said members may be made of saw tooth shape in order to facilitate this action.

Although but one form of the invention has been shown and described in detail, it will be understood that changes may be made in the precise form and arrangement of the parts without departing from the spirit of the invention.

I claim:

1. In a two-speed coaster brake for velocipedes and the like, a hollow wheel hub and means for rotating the hub including a driving member and a high speed screw shaft fixed thereto, a high speed conical driving clutch member threaded on the high speed screw shaft, a high speed driven clutch member splined in the hub, yielding means resisting movement of the high speed driven clutch member away from the high speed driving clutch member, means limiting the travel of the high speed driving clutch member, a low speed screw shaft, reduction gearing connecting the driving member to said low speed screw shaft, a low speed conical driving clutch member threaded on the low speed screw shaft, a low speed driven clutch means rigid with the hub, and means actuated by clutch closing movement of the low speed driving clutch member for moving the high speed driven clutch member out of contact with the high speed driving clutch member against the resistance of said yielding means; in which the high speed driven clutch member is in the form of a ring having a continuous internal conical clutch surface for engagement with the high speed driving clutch member, and having a skirt provided with a plurality of axially extending slots, and the low speed driven clutch means is in the form of a plurality of interiorly tapered projections on the interior of the hub slidably engaged by said slots and serving to spline the high speed driven clutch member in the hub.

2. In a two speed coaster brake for velocipedes and the like, a hollow wheel hub and means for rotating the hub including a driving member and a high speed screw shaft fixed thereto, a high speed driving clutch member threaded on the high speed screw shaft, a high speed driven clutch member splined in the hub, yielding means resisting movement of the high speed driven clutch member away from the high speed driving clutch member, means limiting the travel of the high speed driving clutch member, a low speed screw shaft, reduction gearing connecting the driving member to said low speed screw shaft, a low speed driving clutch member threaded on the low speed screw shaft, a low speed driven clutch means rigid with the hub, and means actuated by clutch closing movement of the low speed driving clutch member for moving the high speed driven clutch member out of contact with the high speed driving clutch member against the resistance of said yielding means; in which the yielding means for opposing longitudinal movement of the high-speed driven clutch member comprises a detent plunger mounted for radial sliding movement in the hub, and with its inner end bearing on an inclined surface of said driven clutch member, and a spring mounted on the exterior of the hub and resisting radial movement of said detent.

3. A device as set forth in claim 1 in which the means for moving the high-speed driven clutch member out of contact with the high-speed driving clutch member comprises an annular member splined in the hub in contact with the high speed driven clutch member, and having a shoulder in the path of movement of the low-speed driving clutch member as it moves toward driving position.

4. In a two speed coaster brake for velocipedes and the like, a hollow wheel hub and means for rotating the hub including a driving member and a high speed screw shaft fixed thereto, a high speed driving clutch member threaded on the high speed screw shaft, a high speed driven clutch member splined in the hub, yielding means resisting movement of the high speed driven clutch member away from the high speed driving clutch member, means limiting the travel of the high speed driving clutch member, a low speed screw shaft, reduction gearing connecting the driving member to said low speed screw shaft, a low speed driving clutch member threaded on the low speed screw shaft, a low speed driven clutch means rigid with the hub, and means actuated by clutch closing movement of the low speed driving clutch member for moving the high speed driven clutch member out of contact with the high speed driving clutch member against the resistance of said yielding means; including further braking means for the hub, means for actuating the braking means responsive to backward rotation of the low-speed screw shaft relative to the low-speed driving clutch member, and means responsive to backward rotation of the wheel hub to prevent actuation of the brake.

5. In a two speed coaster brake for velocipedes and the like, a hollow wheel hub and means for rotating the hub including a driving member and a high speed screw shaft fixed thereto, a high speed driving clutch member threaded on the high speed screw shaft, a high speed driven clutch member splined in the hub, yielding means resisting movement of the high speed driven clutch member away from the high speed driving clutch member, means limiting the travel of the high speed driving clutch member, a low speed screw shaft, reduction gearing connecting the driving member to said low speed screw shaft, a low speed driving clutch member threaded on the low speed screw shaft, a low speed driven clutch means rigid with the hub, and means actuated by clutch closing movement of the low speed driving clutch member for moving the high speed driven clutch member out of contact with the high speed driving clutch member against the resistance of said yielding means; including further, braking means for the hub, means for actuating the braking means responsive to movement of the low-speed driving clutch member away from its clutching position, and means providing a frictional drag connection between the hub and said low-speed driving clutch member.

6. A device as set forth in claim 5 including further yielding means resisting movement of the low-speed driving clutch member in the direction to apply the brake, and providing a frictional drag resisting its rotary movement.

7. In a load controlled two-speed gear and hub brake for velocipedes and the like, a driving member, means for transmitting rotation from said driving member to the hub of the vehicle including a high-speed driving clutch member, a driven clutch member non-rotatably connected to the hub and means responsive to forward rotation of the driving clutch member for moving said high speed driving clutch member into driving engagement with the driven clutch member and transmitting rotation thereto; a low-speed driving clutch member, means including reduction gearing for rotating said low speed driving clutch member from said driving member, said last-mentioned means including means responsive to forward rotation of the driving member for moving the low-speed driving clutch member into driving engagement with the hub; means for limiting the amount of torque transmitted from the high speed driving clutch member to the driven clutch member, and means whereby engagement of the low speed driving clutch member with the hub causes disengagement of the high speed clutch members; in which the hub is provided with an annular series of clutch elements formed in the interior thereof for engagement by the low speed driving clutch member, and the high speed driven clutch member is in the form of an annular member having a continuous conical interior clutch surface splined in the hub by means of said annular series of clutch elements.

References Cited in the file of this patent

UNITED STATES PATENTS

| | | |
|---|---|---|
| 942,520 | Rockwell | Dec. 7, 1909 |
| 2,742,124 | Hood | Apr. 17, 1956 |